United States Patent
Kulkarni et al.

(10) Patent No.: US 10,167,363 B2
(45) Date of Patent: Jan. 1, 2019

(54) MODIFIED POLYBUTYLENE NAPHTHALATE FOR IMPROVED PERFORMANCE AND PROCESS OF MAKING THEREOF

(71) Applicant: ESTER INDUSTRIES LIMITED, Udhamsingh Nagar, Uttarakhand (IN)

(72) Inventors: Sanjay Tammaji Kulkarni, Uttarakhand (IN); Balasundaram Dillyraj, Uttarakhand (IN); Chandrakant Omkar Vyas, Uttarakhand (IN)

(73) Assignee: Ester Industries Limited, Udhamsingh Nagar, Uttarakhand (IN)

( * ) Notice: Subject to any disclaimer, the term of this patent is extended or adjusted under 35 U.S.C. 154(b) by 14 days.

(21) Appl. No.: 15/502,196

(22) PCT Filed: Aug. 5, 2015

(86) PCT No.: PCT/IN2015/050080
§ 371 (c)(1),
(2) Date: Feb. 6, 2017

(87) PCT Pub. No.: WO2016/020937
PCT Pub. Date: Feb. 11, 2016

(65) Prior Publication Data
US 2017/0233523 A1 Aug. 17, 2017

(30) Foreign Application Priority Data
Aug. 5, 2014 (IN) .............. 2215/DEL/2014

(51) Int. Cl.
| | |
|---|---|
| *C08G 63/189* | (2006.01) |
| *C08K 3/34* | (2006.01) |
| *C08L 67/02* | (2006.01) |
| *C08G 63/80* | (2006.01) |
| *C08K 5/098* | (2006.01) |
| *C08G 63/91* | (2006.01) |
| *C08K 3/013* | (2018.01) |
| *C08G 63/181* | (2006.01) |
| *C08G 63/85* | (2006.01) |
| *C08K 5/00* | (2006.01) |
| *C08K 3/36* | (2006.01) |

(52) U.S. Cl.
CPC ......... *C08G 63/189* (2013.01); *C08G 63/181* (2013.01); *C08G 63/80* (2013.01); *C08G 63/85* (2013.01); *C08G 63/916* (2013.01); *C08K 3/013* (2018.01); *C08K 3/34* (2013.01); *C08K 3/36* (2013.01); *C08K 5/0083* (2013.01); *C08K 5/098* (2013.01); *C08L 67/02* (2013.01)

(58) Field of Classification Search
CPC .... C08G 63/189; C08G 63/85; C08G 63/181; C08G 63/80; C08K 5/0083; C08K 3/0033; C08K 3/013
USPC ........................................................ 524/132
See application file for complete search history.

(56) References Cited

U.S. PATENT DOCUMENTS

| | | | |
|---|---|---|---|
| 5,612,423 A * | 3/1997 | Burkett ................ | C08G 63/189 525/444 |
| 5,663,238 A | 9/1997 | Wang | |
| 6,451,966 B1 * | 9/2002 | Leffew ................... | C08G 63/80 528/481 |
| 2005/0267285 A1 | 12/2005 | Kulkarni | |

FOREIGN PATENT DOCUMENTS

| | | | |
|---|---|---|---|
| EP | 1 650 260 A | * | 4/2006 |
| EP | 1 650 260 A1 | | 4/2006 |

OTHER PUBLICATIONS

International Search Report and Written Opinion for PCT/IN2015/050080 dated Jan. 27, 2016.
International Preliminary Report on Patentability for PCT/IN2015/050080 dated Nov. 2, 2016.

* cited by examiner

*Primary Examiner* — Michael Bernshteyn
(74) *Attorney, Agent, or Firm* — Martin & Ferraro, LLP

(57) ABSTRACT

A polybutylene naphthalate polyester and process for preparing polybutylene naphthalate polyester, for improving barrier performance of polyesters used in making of monolayer or multilayer containers. The process comprising: a) mixing butane diol with polymerization catalysts, monoethylene glycol, color toner, and at least one crystallization suppressing agent; b) reacting said mixture with naphthalene dicarboxylic acid or ester thereof to obtain oligomerized product via esterification or ester interchange; c) polymerizing said oligomer using at least one polymerization catalyst to obtain amorphous polybutylene naphthalate polyester chips; d) crystallizing said polybutylene naphthalate polyester chips; and e) subjecting said polyester chips to solid state polymerization to upgrade the intrinsic viscosity (I.V.) up to more than 0.40 dl/gm.

10 Claims, No Drawings

MODIFIED POLYBUTYLENE NAPHTHALATE FOR IMPROVED PERFORMANCE AND PROCESS OF MAKING THEREOF

This is a National Phase Application under 35 USC 371 of PCT/IN2015/050080 filed Aug. 5, 2015 (published on Feb. 11, 2016 as WO 2016/020937); which claims priority to Indian Application No. 2215/DEL/2014 filed Aug. 5, 2014; all of which are incorporated by reference herein in their entirety.

FIELD OF THE INVENTION

The present invention generally relates to polyester products and improved performance thereof. More particularly, the present invention relates to a process for the preparation of copolymers of polybutylene naphthalate and products thereof for use in applications wherein improved thermal, mechanical, barrier and optical properties are achieved.

BACKGROUND OF THE INVENTION

Polybutylene Naphthalate (PBN) is a polyester of the naphthalate polyester family. It has excellent wear resistance, sliding characteristics, hydrolysis resistance, and chemical resistance. Compared to its analogous polyester, it has superior gas barrier properties, excellent chemical and hydrolysis resistance, excellent sliding performance, high deflection temperature under load and faster crystallization making it superior over other polyesters such as polybutylene terphthalate, polyethylene naphthalate, polyethylene terephthalate, and Polyethylene terephthalate glycol-modified (PET-G).

PBN polyester has been used in a variety of applications because of its better wear properties than Polyphenylene Sulfide (PPS) and polyacetal in addition to excellent chemical resistance, superior barrier properties, and superior sliding characteristics.

When meshing of gears made from the same material is undesirable, PBN is used and its current commercial application include components in gear-change levers. Due to its superior gas-barrier properties. It is utilized as backsheet material for solar battery chargers where a service life of less than 10 years would be anticipated and the charger would typically be used indoors. Backsheets are normally comprised of multilayer structures. PBN can further be used to make fuel tanks, hose and fuel transporters.

The applications of PBN in packaging are very limited so far because of its fast crystallization characteristic that results in opaque container, but at the same time its superior gas barrier properties makes it one of the most preferable polyester for containers, hoses, fuel storage and transporter.

Amorphous polymer can be crystallized by thermal crystallization while cooling from the melt and heating solidified polymer above ambient temperature, and mechanical stretching (Strain induced crystallization). Crystallization affects optical, mechanical, thermal and chemical properties of polymers depending upon the size of crystals. The degree of crystallinity is estimated by different analytical methods and it typically ranges between 10% and 80%, thus crystallized polymers are often called "semicrystalline" materials.

The properties of semicrystalline polyesters are determined not only by the degree of crystallinity, but also by the size and orientation of the molecular chains.

It is therefore desirable to achieve the proper crystallization of polybutylene naphthalate polyester to improve their optical, barrier, mechanical, and thermal properties. Semicrystalline polymers usually appear opaque because of light scattering on the numerous boundaries between the crystalline and amorphous regions. The rate of crystallization is estimated by the half time crystallization method. The half time crystallization ($T_{1/2}$) is the half time required to achieve the crystallization of melt polymer while stretching or heating. The more value of the $T_{1/2}$ means slow rate of crystallization and vice-versa. $T_{1/2}$ for polyethylene terephthalate (PET) is 18 seconds, for polyethylene naphthalate (PEN) is 115 seconds, for PBT is 3 seconds and for PBN is 1 second. Thus, due to fastest rate of crystallization, polybutylene naphthalate (PBN) is always found opaque in appearance which makes it undesirable for use in manufacturing transparent containers.

It is desirable to design and produce a modified polybutylene naphthalate polyester by controlling its crystal size and rate of crystallization, as the controlled crystallization of polybutylene naphthalate further enhances its transparency.

There has been a disclosure of the process of suppressing the crystallization rate of polybutylene naphthalate. Reference is made to U.S. Pat. No. 6,451,966 wherein a process to suppress the rate of crystallization of polyesters such as PET, PBT, PEN, PBN in Solid State Polymerization (SSP) is disclosed. In this process, the incorporation of low concentration of isophthalaic acid and ethylene glycol has been disclosed to suppress the rate of crystallization during SSP process so as to achieve better SSP rate. The patent '966' does not disclose any increase in crystallinity and transparency of polybutylene naphthalate and limits its effect to transparency of product made of polybutylene naphthalate polyester. It does not provide solution of removing haziness in container made of polybutylene naphthalate copolymer.

Reference may be made to U.S. Pat. No. 5,612,423. which suggest a process to prepare crystallizable copolymers such as PET, PBN, with high molecular weights and high melting points. Here, the Solid State Polymerization (SSP) is continued until the Intrinsic Viscosity (I.V.) of the polymer reaches any desired level. Thus, the claimed process controls the rate of crystallization on the basis of I.V. characteristics. Further, it does not disclose the use of isophthalaic acid, monoethylene glycol or diethylene glycol or cyclohexanedimethanol (CHDM) as comonomer. The said process, however, does not teach about the transparency and improved barrier properties of the final product. In said patent, there is no reference of transparency and barrier properties of polybutylene naphthalate while making container.

However, there are not many reports which specifically described a modified polybutylene naphthalate. Hence, there is an urgent need to produce modified polybutylene naphthalate polyester with enhanced transparency and improved properties. The present invention overcomes the problem of loss of transparency in polybutylene naphthalate due to its fast crystallization of polybutylene naphthalate by achieving the proper crystallization of polybutylene naphthalate.

The crystallization rate and growth of crystal size is controlled by slightly retarding the rate of crystallization. The slight retardation in the rate of crystallization promotes the requisite growth of nucleation thereby limiting the size of the crystallites and ensures transparency along with increase crystallinity making them usable in packaging application for transparent containers in both monolayer as well as multilayer containers.

OBJECT OF THE INVENTION

An object of the present invention is to modify polybutylene naphthalate polyester for achieving excellent transparency, high barrier properties and use thereof in manufacturing containers.

Yet, another object of the present invention is to provide transparent polybutylene naphthalate polyester having excellent chemical resistance, excellent hydrolysis resistance, excellent sliding performance, high deflection temperature under load and fast but controlled crystallization.

Further, the object of the present invention is to provide a process for preparing transparent polybutylene naphthalate polyester with improved optical properties, such as high clarity and excellent transparency.

Still further, the object of the present invention is to provide packaging containers made of polyester and capable of withstanding high temperature without undergoing any deformation and shrinkage and has improved shelf life due to its superior barrier properties.

Another object of the present invention is to provide a process for preparing transparent containers comprising modified polybutylene naphthalate (clear or transparent polybutylene naphthalate (PBN)) having superior barriers properties.

Further, the object of the present invention is to prepare containers using copolymers of polybutylene naphthalate through Injection Blow Moulding (IBM), Injection Stretch Blow Moulding (ISBM), and Extrusion Blow Moulding (EBM) and the like methods by avoiding thermal haze occurring due to faster crystallization of polybutylene naphthalate.

Other objects and advantages of the present invention will be more apparent from the following description which is not intended to limit the scope of the present disclosure.

SUMMARY OF THE INVENTION

The present invention relates to products made of the modified polybutylene naphthalate polyester, comprising: at least one naphthalate dicarboxylic acid or ester thereof; butane diol; at least one comonomer selected from the group of alkylene diol, cyclic diol aliphatic acid, aromatic acid, polyester in an amount of 1 to 20 wt %; at least one agent selected from the group consisting of liquid plasticizer in an amount of 0.5 to 2 wt %; at least one nucleating agent in an amount of 10 ppm to 2000 ppm; at least one branching agent in an amount of 10 ppm to 2000 ppm; at least one antioxidizing agent in an amount ranging from 0.1 to 5 wt %; at least one stabilizing agent; at least one additive and optionally, at least one end capped oligomer in an amount of 1 to 20 wt %, wherein, said polybutylene naphthalate polyester is characterized, wherein said polyester exhibits one or more properties as follows: color L* range is greater than 50 (>50); color b* ranges from 1 to 15; monoethylene content of less than 10%; glass transition temperature in the range of 60° C. to 85° C.; and haze value <7 NTU.

In one embodiment, the present invention relates to a transparent polybutylene naphthalate polyester for use in monolayer and multilayer container manufacturing, the polyester product exhibiting at least one of: a polyethylene terephthalate equivalent internal viscosity of >0.50 dL/g; an oligomer content of less than 1.5 wt %; a diethylene content of less than 10 wt %; a carboxylic end groups of less than 100 meq/kg; haze value <7 NTU, wherein said polybutylene naphthalate polyester is used to improve the barrier performance and maintain transparency of polyethylene terephthalate polyester and products made thereof.

In accordance to one embodiment, the present invention relates to a process for preparing transparent polybutylene naphthalate polyester, for improving barrier performance of polyesters used in making of monolayer or multilayer containers, comprising steps of: mixing butane diol with polymerization catalysts, monoethylene glycol, color toner, and at least one crystallization suppressing agent in an amount ranging from 1 to 20 wt. % based on total weight of the polyester, wherein said crystallization suppressing agent controls the rate of crystallization so as to control size and shape of crystals to ensure transparency; reacting said mixture with naphthalene dicarboxylic acid or ester thereof to obtain oligomerized product via esterification or ester interchange; polymerizing said oligomer using at least one polymerization catalyst to obtain amorphous polybutylene naphthalate polyester chips; crystallizing said polybutylene naphthalate polyester chips; and subjecting said polyester chips to solid state polymerization to upgrade the intrinsic viscosity (I.V.) up to more than 0.40 dl/gm.

In an embodiment of the present invention, the comonomer (hereinafter known as "crystallization suppressing agent" or "crystallization control agent") used for suppressing the rate of crystallization, is at least one selected from the group of alkylene diol, cyclic diol, aliphatic or aromatic acid or polyester or combination thereof. The comonomer used in the process controls the required rate of crystallization of polybutylene naphthalate, thus the comonomer acts as a crystallization suppressing or retarding agent or quenching agent during thermal crystallization while cooling from the melt phase.

In yet another embodiment of the present invention, the alkylene diol used as crystallization suppressing agent is selected from the group consisting of monoethylene glycol, diethylene glycol, propanediol, butanediol, hexane diol, and the like.

In yet another embodiment of the present invention, the cyclic diol used as crystallization suppressing agent is selected from the group consisting of cyclohexane dimethanol, and the like.

The carboxylic acid used as crystallization suppressing agent is selected from the group consisting of oxalic acid, malonic acid, succinic acid, glutaric acid, adipic acid, pimelic acid, suberic caid, azelaic acid, sebacic acid, brassidic caid, thapsic acid, maleic acid, fumaric acid, glutaconic acid, alpha-hydromuconic acid, beta-hydromuconic acid, alpha-butyl, alpha-ethylglutaric acid, alpha-beta-diethyl succinic acid, isophthalic acid, terephthalic acid, hemimellitic acid and 1,4-cyclohexanedicarboxylic acids.

The aromatic acid used as crystallization suppressing agent is an isophthalic acid.

The polyester used as crystallization suppressing agent is selected from the group consisting of polyethylene terphthalate (PET), polyethylene terphthalate glycol-modified (PET-G), polyethylene naphthalene (PEN).

(The polybutylene naphthalate polyester obtained in accordance with the process of the present invention can be used in packaging applications such as preparing transparent monolayer and multilayer containers or products thereof. The material or container obtained from the polyester of the present invention has comparatively excellent transparency and superior mechanical, thermal, gas barrier, and optical properties.

The present invention relates to polybutylene naphthalate polyester used for making the transparent and gas barrier containers by using at least one moulding process selected from the group consisting of Injection Blow Moulding (IBM), Injection Stretch Blow Moulding (ISBM), Extrusion Blow Moulding (EBM, including normal blow moulding, and heat set blowing process.

These and other features, aspects, and advantages of the present subject matter will become better understood with reference to the following description and added claims.

This summary is provided to introduce a selection of concepts in a simplified form. This summary is not intended to identify the key features or essential features of the claimed subject matter, nor intended to be used to limit the scope of the claimed subject matter.

DETAILED DESCRIPTION OF THE INVENTION

The present inventors has found that the use of selected crystallization suppressing agents such as aliphatic or cyclic glycol, aliphatic or aromatic acid, and polyesters, retards or decrease the rate of crystallization of the polybutylene naphthalate polyester promoting the requisite growth of the crystallites while reducing their size. Such slight suppression of the rate of crystallization of polybutylene naphthalate polyester results in its improved mechanical, thermal, optical and barrier properties.

It has also been found that the use of some preferred comonomer improves transparency and gas barrier properties of the polybutylene naphthalate copolyester while still achieving the requisite higher crystallinity and glass transition temperature.

The comonomers used in the process of the present invention also known as crystallization suppressing agents that control the crystallization of the modified polybutylene naphthalate thereby achieving good transparency and barrier properties thereof.

The present invention provides modified polybutylene naphthalate polyester that can be used in packaging to produce transparent container. A packaging container, a packaging material or a preform prepared from the modified polybutylene naphthalate polyester provides excellent transparency, superior barrier properties, good mechanical and thermal properties.

The present invention provides a polybutylene naphthalate polyester having excellent transparency and high barrier properties comprising: naphthalate dicarboxylic acid or ester thereof; butane diol; crystallization suppressing agent; agent selected from the group consisting of liquid plasticizer; nucleating agent; branching agent; anti-oxidizing agent; stabilizing agent; additive and optionally, end capped oligomer, wherein said polyester exhibits one or more properties as follows: color $L^*$ range is greater than 50 (>50); color $b^*$ ranges from 1 to 15; monoethylene content of less than 10%; glass transition temperature in the range of 60° C. to 85° C.; and haze value <7 NTU.

The present invention also relates to products made of transparent polybutylene naphthalate polyester, comprising: one naphthalate dicarboxylic acid or ester thereof; butane diol; one comonomer selected from the group of alkylene diol, cyclic diol aliphatic acid, aromatic acid, polyester in an amount of 1 to 20 wt %; agent selected from the group consisting of liquid plasticizer in an amount of 0.5 to 2 wt %; nucleating agent in an amount of 10 ppm to 2000 ppm; branching agent in an amount of 10 ppm to 2000 ppm; anti-oxidizing agent in an amount ranging from 0.1 to 5 wt %; stabilizing agent; additive and optionally, end capped oligomer in an amount of 1 to 20 wt %.

The polyester of the present invention exhibits one or more properties of color $L^*$ ranges from 58 to 73%; color $b^*$ ranges from 1 to 15; monoethylene content of less than 6.5%; glass transition temperature in the range of 60° C. to 85° C.; haze value is >5 NTU.

The polyester is obtained from the esterification of naphthalene dicarboxylic acid (NDA) or 2,6-dimethyl naphthalene dicarboxylate (NDC) and 1,4-butane diol; and subsequent polymerization of the prepolymer obtained from the esterification in presence of at least one comonomer selected from the group consisting of alkylene diol, cyclic diol, aliphatic or aromatic acid or polyester. The comonomer used in the process controls the required rate of crystallization of polybutylene naphthalate, thus the comonomer acts as a crystallization suppressing or retarding agent or quenching agent during thermal crystallization while cooling from the melt phase.

The present invention provides a process wherein the alkylene diol used as comonomer is selected from the group consisting of monoethylene glycol, diethylene glycol, propanediol, butanediol, hexane diol and the like.

The present invention relates to a process wherein the cyclic diol used as comonomer is selected from the group consisting of cyclohexane dimethanol, and the like.

The carboxylic acid used as comonomer is selected from the group consisting of oxalic acid, malonic acid, succinic acid, glutaric acid, adipic acid, pimelic acid, suberic caid, azelaic acid, sebacic acid, brassidic caid, thapsic acid, maleic acid, fumaric acid, glutaconic acid, alpha-hydromuconic acid, beta-hydromuconic acid, alpha-butyl, alpha-ethylglutaric acid, alpha-beta-diethyl succinic acid, isophthalic acid, terephthalic acid, hemimellitic acid and 1,4-cyclohexanedicarboxylic acids.

The polyester used as comonomer is selected from the group consisting of polyethylene terphthalate (PET), polyethylene terphthalate glycol modified (PET-G), polyethylene naphthalene (PEN).

The word "comonomer" and "crystallization suppressing agent" can interchangeably used throughout the specification without affecting their original intention or technical contribution to the present invention.

Examples of the comonomer useful for the purpose of the present invention is at least one selected from the group consisting of monoethylene glycol, diethylene glycol, isophthalaic acid, polyethylene naphthalate, polyethylene terphthalate, polyethylene terphthalate glycol-modified (PET-G) and 1,4-cyclohexane dimethanol in an amount up to 5%, nucleating agent in an amount of (10 ppm to 2000 ppm) and liquid plasticizer in an amount of (0.5 to 2 wt % based on polyester weight), at least one stabilizing agent and at least one anti-oxidizing agent in an amount ranging from (0.1 to 5 wt. % based on polyester weights). Other agents useful for the purpose of the present invention include at least one end capped oligomer in an amount from 1 to 20 wt % based on the total weight of the polyester.

The branching agent useful for the purpose of the present invention includes but is not limited to 1,2,4-benzenetricarboxylic acid (trimellitic acid); trimethyl-1,2,4-benzenetricarboxylate; 1,2,4-benzenetricarboxylic anhydride (trimellitic anhydride); 1,3,5-benzenetricarboxylic acid; 1,2,4,5-benzenetetracarboxylic acid (pyromellitic acid); 1,2,4,5-benzenetetracarboxylic dianhydride (pyromellitic anhydride); 3,3',4,4'-benzophenonetetracarboxylic dianhydride; 1,4,5,8-naphthalenetetracarboxylic dianhydride; citric acid; tetrahydrofuran-2,3,4,5-tetracarboxylic acid; 1,3,5-cyclohexanetricarboxylic acid; pentaerythritol, 2-(hydroxymethyl)-1,3-propanediol; 2,2-bis(hydroxymethyl) propionic acid; sorbitol; glycerol and combinations thereof. Particularly, branching agents such as pentaerythritol, trimellitic acid, trimellitic anhydride, pyromellitic acid, pyromellitic anhydride and sorbitol are used.

The branching agent present in the polyester of the present invention is in an amount of 10 ppm to 2000 ppm.

The nucleating agent improves the crystallinity and increases heat deformation temperature of the polyester product. The nucleating agent can be organic or inorganic. The inorganic nucleating agent useful for the purpose of the present invention includes but is not limited to calcium silicate, nano silica powder, talc, microtalc, aclyn, kaolinite, montmorillonite, synthetic mica, calcium sulfide, boron nitride, barium sulfate, aluminum oxide, neodymium oxide and a metal salt of phenyl phosphonate. The inorganic nucleating agent can be modified by an organic material to improve its dispersibility in the polyester product of the present invention.

Examples of organic nucleating agent includes but is not limited to carboxylic acid metal salts such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluoylate, sodium salicylate, potassium salicylate, zinc salicylate, aluminum dibenzoate, potassium dibenzoate, lithium dibenzoate, sodium β-naphthalate and sodium cyclohexane carboxylate; organic sulfonates such as sodium p-toluene sulfonate and sodium sulfoisophthalate; carboxylic acid amides such as stearic acid amide, ethylene bis-lauric acid amide, palmitic acid amide, hydroxystearic acid amide, erucic acid amide and tris(t-butylamide) trimesate; phosphoric compound metal salts such as benzylidene sorbitol and derivatives thereof, sodium-2,2'-methylenebis(4,6-di-t-butylphenyl)phosphate, and 2,2-methylbis(4,6-di-t-butylphenyl)sodium.

The nucleating agent present in the polyester of the present invention is in an amount of 10 ppm to 2000 ppm.

Examples of liquid plasticizer useful for the purpose of the present invention includes but is not limited to N-isopropyl benzene sulfonamide, N-tert-butyl benzene sulfonamide, N-pentyl benzene sulfonamide, N-hexyl benzene sulfonamide, N-n-octyl benzene sulfonamide, N-methyl-N-butyl benzene sulfonamide, N-methyl-N-ethyl benzene sulfonamide, N-methyl-N-propyl benzene sulfonamide, N-ethyl-N-propyl benzene sulfonamide, N-ethyl p-ethylbenzenesulfonamide, N-ethyl p-(t-butyl)benzene sulfonamide, N-butyl p-butyl benzene sulfonamide, N-butyl toluene sulfonamide, N-t-octyl toluene sulfonamide, N-ethyl-N-2-ethylhexyl toluene sulfonamide, N-ethyl-N-t-octyl toluene sulfonamide and tri-octyltrimellitate.

Examples of anti-oxidizing agent includes but is not limited to irganox 1010, irganox 1076, irgafos 126 and irgafos 168.

The anti-oxidizing agent present in the polyester of the present invention is anti-oxidizing agent in an amount of 0.1 wt % to 5 wt %.

Examples of stabilizing agent includes but is not limited to ortho-phosphoric acid, trimethylphosphate (TMP), triphynylphosphate (TPP) and Triethyl phosphono acetate (TEPA). Preferably ortho-phosphoric acid is used as stabilizing agent.

Examples of end capped oligomer includes but is not limited to oligomers of polyethylene terephthalate, polybutylene terephthalate, polytrimethylene terephthalate, polytreimethylenenaphthalate and polybutylenenaphthalate.

The end-capped oligomer present in the polyester of the present invention is in an amount of 1 to 20 wt %.

The polyester product of the present invention additionally may comprise additives which include but are not limited to pigments; thermal stabilizers, ultraviolet light stabilizers processing aids; impact modifiers.

In one embodiment, the present invention relates to a process for preparing transparent polybutylene naphthalate polyester, for improving barrier performance of polyesters used in making of monolayer or multilayer containers, comprising steps of: mixing butane diol with polymerization catalysts, monoethylene glycol, color toner, and at least one crystallization suppressing agent wherein said crystallization suppressing agent controls the rate of crystallization so as to control size and shape of crystals to ensure transparency; reacting said mixture with naphthalene dicarboxylic acid or ester thereof to obtain oligomerized product via esterification or ester interchange; polymerizing said oligomer using at least one polymerization catalyst to obtain amorphous polybutylene naphthalate polyester chips; crystallizing said polybutylene naphthalate polyester chips; and subjecting said polyester chips to solid state polymerization to upgrade the intrinsic viscosity (I.V.) up to more than 0.40 dl/gm.

In one another embodiment transparent polybutylene naphthalate polyester can be made by a process comprising: obtaining prepolymers by reacting dicarboxylic acid or ester made thereof, and butane diol with crystallization suppressing agent in presence of catalysts, crystallization suppressing agent or comonomer, color toner, and other additives essential for the process, wherein the esterification is carried out at about 150° C. to 202° C. of product temperature and about 220° C. to 240° C. of HTM temperature under atmospheric pressure for about 4 to 5 hours, the byproduct is removed from the reactor after about 2.5 hours and subsequently at the end of the esterification; polymerizing the prepolymers so obtained in a polycondensation reactor at temperature about 195° C. to 250° C. (product temperature) and about 260° C. to 270° C. (HTM temp) under ambient pressure; melt extruding the copolyester, and cutting under chilled water into amorphous chips; solid state polymerizing the chips to achieve the required I.V. of the polyester.

In one of the embodiments the present invention relates to a transparent polybutylene naphthalate polyester for use in monolayer and multilayer container manufacturing, the polyester product exhibiting at least one of: a polyethylene terephthalate equivalent internal viscosity of >0.50 dL/g; an oligomer content of less than 1.5 wt %; a diethylene content of less than 10 wt %; a carboxylic end groups of less than 100 meq/kg; haze value <7 NTU, wherein said polybutylene naphthalate polyester is used to improve the barrier performance and maintain transparency of polyethylene terephthalate polyester and products made thereof.

In one embodiment of the present invention the dicarboxylic acid used in the aforementioned process includes but is not limited to oxalic acid, malonic acid, succinic acid, glutaric acid, adipic acid, pimelic acid, suberic caid, azelaic acid, sebacic acid, brassidic caid, thapsic acid, maleic acid, fumaric acid, glutaconic acid, alpha-hydromuconic acid, beta-hydromuconic acid, alpha-butyl, alpha-ethylglutaric acid, alpha-beta-diethyl succinic acid, isophthalic acid, terephthalic acid, hemimellitic acid, 1,4-cyclohexanedicarboxylic acids, and naphthalate dicarboxylic acid. In one embodiment of the present invention the dicarboxylic acid used is selected from the group consisting of terephthalic acid; isophthalic acid; 2,6 naphthalene dicarboxylic acid and combinations thereof. In a preferred embodiment of the present invention the dicarboxylic acid used in the process is 2,6-naphthalene dicarboxylic acid or ester thereof. In one embodiment the preferred dicarboxylic acid is 2,6-naphthalene dicarboxylic acid.

In an embodiment of the present invention, the crystallization suppressing agent is at least one selected from the group of alkylene diol, cyclic diol, aliphatic or aromatic acid or polyester. The suppressing agent used in the process controls the required rate of crystallization of polybutylene naphthalate during the process, thus the suppressing agent acts as a crystallization suppressing or retarding agent or quenching agent during thermal crystallization while cooling from the melt phase.

In one embodiment of the present invention the crystallization suppressing agent is at least one selected from the group consisting of monoethylene glycol, diethylene glycol, isophthalic acid, cyclohexane dimethanol, or combination thereof.

In one embodiment of the present invention the polyester is at least one selected from the group consisting of polyethylene terphthalate (PET), polyethylene terphthalate glycol modified (PET-G), polyethylene naphthalene (PEN) or combination thereof.

In one embodiment of the present invention the crystallization suppressing agent is used in an amount ranging from about 1 to 20 wt. % based on the polymer weight.

In one embodiment the ester of the aromatic dicarboxylic acid is selected from the group consisting of dimethyl terephthalate; dimethyl isophthalate; dimethyl-2,6-naphthalene dicarboxylate, and combinations thereof.

In one embodiment where cycloaliphatic diol such as (cis, trans) 1,3-cyclohexane dimethanol and (cis, trans) 1,4 cyclohexane dimethanol is used it is supplemented with at least one additional cyclic or branched diol.

The suppressing agent is reacted with at least one aromatic dicarboxylic acid or ester thereof at 200 to 260° C. to obtain prepolymer after esterification or trans-esterification. The reaction is catalyzed by catalysts such as the acetate or other alkanoate salts of Co(II) and Sb(III), oxides of Sb(III) and Ge(IV), and Ti(OR)$_4$ (where R is an alkyl group having 2 to 12 carbon atoms). Glycol solubilized oxides of these metal salts such as n-butylstannoic acid can also be used.

In one preferred embodiment catalysts include but are not limited to antimony trioxide, germanium dioxide, tetraisopropyltitanate. The esterified or trans-esterified product is simultaneously converted into oligomerized product. The oligomerized product can be used for coating normal polyester chips and then processed for solid state polymerization to increase the viscosity of polyester to get improved Tg and mechanical properties.

Examples of alkylene aryl dicarboxylate include but are not limited to ethylene terephthalate; ethylene isophthalate; ethylene-2,6-naphthalate; ethylene-3,4'-diphenyl ether dicarboxylate; ethylene hexahydrophthalate; ethylene-2,7-naphthalate; ethylene phthalate and ethylene-4,4'-methylenebis(benzoate).

The polymerization reaction is carried out by a process known to a person skilled in the art which includes process steps such as polycondensation and solid state polymerization reactions to obtain modified polybutylene naphthalate with excellent transparency. The polyester manufactured in polymerization reaction is crystallized in any convention crystallizer and subsequently processed in batch or continuous solid state polymerization (SSP) to get the desired intrinsic viscosity (IV). The batch SSP may be pursed with nitrogen to expedite the reaction. In continuous SSP the circulating nitrogen gas is used as a carrier of by-products.

The polymerization reaction is carried out using at least one agent selected from the group consisting of branching agent, nucleating agent and liquid plasticizer.

Additives may also be added before or during or after the polymerization reaction to impart requisite property to the resulting polyester. Such additives include but are not limited to pigments; flame retardant additives such as decabromodiphenyl ether and triarylphosphates, such as triphenylphosphate; reinforcing agents such as glass fibers; thermal stabilizers; ultraviolet light stabilizers processing aids, impact modifiers, flow enhancing additives, ionomers, liquid crystal polymers, fluoropolymers, olefins including cyclic olefins, polyamides and ethylene vinyl acetate copolymers.

After reaching at a required degree of polymerization in the melt phase of polycondensation reaction the copolymer of polybutylene naphthalate is granulated into chips.

The polymerization reaction is carried out using at least one agent selected from the group consisting of branching agent or chain extending agent, nucleating agent and liquid plasticizers.

Additives may also be added before or during or after the polymerization reaction to impart requisite property to the resulting polyester. Such additives include but are not limited to pigments; thermal stabilizers; ultraviolet light stabilizers processing aids and impact modifiers.

Examples of agents useful for the purpose of the invention are described herein before.

The modified polybutylene naphthalate is extruded and granulated using underwater cutter to obtain chips which are transparent. The chips are dried, injection molded to preform by processing at temperature above its melting point. The preforms are further processed into containers by IBM (Injection Blow Moulding); ISBM (Injection Stretch Blow Moulding). These containers are transparent and can be monolayer or multilayer.

The present invention also provides a packaging product comprising the polyester obtained according the present disclosure. The packaging product can be a preform or a packaging material or a packaging container.

The modified polybutylene naphthalate obtained in accordance with the present invention imparts improved barrier properties and transparency [haze value below 7 Nephelometric Turbidity Units (NTU)], and improves the gas barrier properties of the polyester in which it is added without any adverse effect on haze. The PBN prepared in accordance with the present invention can be used to manufacture containers by normal ISBM, IBM, IM, EBM processes, with or without heat set blow molding process for applications in various beverages, sport drinks, sauces, jams etc. Containers can be monolayer or multilayer.

Another embodiment of the present invention would be the polybutylene naphthalate having haze value of less than 5 NTU.

Further, the polybutylene naphthalate of the present invention is having haze value of less than 3 NTU.

The polybutylene naphthalate polyester of the present invention is used for making the transparent packaging containers and products thereof.

The present invention is further described in light of the following examples which are set forth for illustration purpose only and not to be construed for limiting the scope of the disclosure.

Quality Parameters and Analytical Methods

The polyester of the present invention exhibits one or more properties of intrinsic viscosity greater than 0.48 dl/gm, color L* value is greater than 50%, preferably less than 0.58 dl?gm; color b* ranges from 1.0 to 15.0; monoethylene glycol content of less than 10%; glass transition temperature in the range of 60 to 85° C.; haze value is less than 7 NTU, preferably less than 3 NTU. Said properties are used as quality parameters of the final finished product.

The quality parameters of the polyester in accordance to the present invention, has been measured by various well known analytical methods. Such analytical methods which have been used for the measurement of the physical parameters of the polyester of the present disclosure are: Billmeyer equation for measuring the intrinsic viscosity; HunterLab-ColorFlex Model No 45/0, serial No. CX 0969 for knowing the value of color indicators such as L*, a* and b*; Haze Gard Plus (BYK Gardner) to know haze value as % haze per mm of sample thickness; Gas Chromatography (GC) to determine the DEG content of the polymer; DSC analysis to monitor thermal properties of all polymers samples at heating and cooling rates of 10° C. per minute. DSC is used to know glass transition temperatures (Tg), crystallization exotherm peak temperatures and heats of crystallization (ΔH), as well as peak endotherm temperatures and heats of fusion for all materials.

EXAMPLES

The following non-limiting examples are intended to illustrate, but not to limit, the scope of the present invention.

Example 1: Preparation of Clear/Transparent Polybutylene Naphthalate by Incorporation of Monoethylene Glycol (MEG) as Comonomer In a 250 L reactor equipped with stirrer, condenser, pressuring and vacuum system, 9.43 kg of naphthalene dicarboxylic acid and 2.09 kg of 1,4-butane diol in molar ratio of 1:1.6 for 10 Kg of PBN batch size were made into paste and fed into the esterification reactor. Further 1.48 gm (25 ppm as Ti) of polymerization catalysts TiPT, which can be prepared by mixing TiPT with 200 ml of BDO, is added to the reactor. Other chemicals, such as 1.44 kg (0.60 ppm as MEG) of monoethylene glycol (MEG) added while charging with BDO. Further 0.003 kg (0.3 ppm as BT) of BT prepared by mixing BT with 100 ml of MEG, 0.70 kg (0.20 ppm as BDO) of BDO are added at various stages of the esterification.

Esterification was carried out at 150° C. to 202° C. of product temperature and 220° C. to 240° C. of HTM temperature under atmospheric pressure for 300 minutes. During the esterification 1.97 kg and 2.47 kg of MeOH is collected as by product at after 150 minutes and at the end of the esterification.

Thereafter, the prepolymer along with all additives are transferred into poly condensation reactor and polymerization is conducted at 195° C. to 250° C. (product temperature) and 260° C. to 270° C. (HTM temp) under pressure. The polycondensation reaction was monitored based on reactor agitator power consumption and reaction was terminated to get Intrinsic Viscosity (I.V.) of about 0.58±0.01 dL/g and the polybutylene naphthalate copolyester melt was extruded out and cut under water and collected as chips.

These chips can be further upgraded to required I.V. in solid state polymerization reaction.

Example 2: Preparation of Clear or Transparent Polybutylene Naphthalate by Incorporation of IPA as Comonomer In a 250 L reactor equipped with stirrer, condenser, pressuring and vacuum system, initially 4.7 kg of 1,4-butane diol is heated to a temperature of 150 to 180° C., and it is then reacted with 8 kg of 2,6-dimethyl naphthalene dicarboxylate and 4.1 kg of isophthalaic acid in presence of 2.45 gm (35 ppm as Ti) of polymerization catalysts TnBT catalyst, which can be prepared by mixing it with 200 ml of 1,4-butane diol, at temperature of 170 to 200° C. and atmospheric pressure for two to three hours. The catalysts and isophthalaic acid can be added at various stages of the esterification reaction. The esterification reaction was carried out at temperature of 150° C. to 210° C. under atmospheric pressure for 3 to 4 hours. During the esterification reaction, methanol (MEOH) is collected as by product.

After the esterification reaction was completed, the oligomers along with all additives were transferred into poly condensation reactor and polymerization is conducted at 195° C. to 280° C. under vacuum. The polycondensation reaction was monitored based on reactor agitator power consumption and reaction was terminated to get I.V. of about 0.52 to 0.60 dL/g and finally the polybutylene naphthalate polyester melt was extruded out and granulated to the polyester chips. These chips can further be upgraded to required I.V. in solid state polymerization reaction.

Example 3: Preparation of Clear Polybutylene Naphthalate by Incorporation of PET as Comonomer In a 250 L reactor equipped with stirrer, condenser, pressuring and vacuum system, 2.9 kg of 1,4-butane diol is heated to a temperature of 140 to 190° C., and it is then reacted with 7.06 kg of 2,6-dimethyl naphthalene dicarboxylate in presence of 2.06 gm (35 ppm as Ti) of polymerization catalysts TnPT catalyst, which can be prepared by mixing TnPT with 200 ml of 1,4-butane diol for each dose, at temperature of 170 to 200° C. and atmospheric pressure for three to four hours. The catalysts can be added at various stages of the esterification reaction. The esterification reaction was carried out at temperature of 150° C. to 210° C. under atmospheric pressure for 3 to 4 hours. During the esterification reaction, methanol (MEOH) is collected as by product.

After the esterification reaction was completed, the oligomers along with all additives were transferred into poly condensation reactor and polymerization is conducted at 195° C. to 280° C. under vacuum. Further, 3.00 kg polyethylene terphthalate was added to the polyester at the end of the polymerization at a constant temperature selected in a range of 240 to 260° C. The preferred temperature is 255° C. temperature. The polycondensation reaction was monitored based on reactor agitator power consumption and reaction was terminated to get I.V. of about 0.52 to 0.60 dL/g. At the end of the process, the polybutylene naphthalate polyester melt was extruded out and granulated to the polyester chips. These chips can further be upgraded to required I.V. in solid state polymerization reaction.

Example 4: Preparation of Clear Polybutylene Naphthalate by Incorporation of PEN as Comonomer In a esterification reactor, 2.9 kg of 1,4-butane diol is heated to a temperature of 140 to 190° C., and then it is reacted with 7.06 kg of 2,6-dimethyl naphthalene dicarboxylate in presence of 2.06 gm (35 ppm as Ti) of polymerization catalysts TnPT catalyst, which can be prepared by mixing TnPT with 200 ml of 1,4-butane diol for each dose, at temperature of 170 to 200° C. and atmospheric pressure for three to four hours. The catalysts can be added at various stages of the esterification reaction. The esterification reaction was carried out at temperature from 150° C. to 210° C. under atmospheric pressure for 3 to 4 hours. During the esterification reaction, methanol (MEOH) is collected as by product.

After the esterification reaction was completed, the oligomers along with all additives were transferred in to polycondensation reactor and polymerization is conducted at 195° C. to 280° C. under vacuum. Further, 3.00 kg polyethylene naphthalate was added to the polyester at the end of the polymerization at a constant temperature selected in a range of 240 to 260° C. The preferred temperature is 255° C. temperature. The polycondensation reaction was monitored based on reactor agitator power consumption and reaction was terminated to get I.V. of about 0.52 to 0.60 dL/g. At the end of the process, the polybutylene naphthalate polyester melt was extruded out and further granulated to the polyester chips. These chips can further be upgraded to required I.V. in solid state polymerization reaction.

The above examples are one of such methods by which modified polybutylene naphthalate can be prepared. The objectives of the invention can be achieved by using comonomer as crystallization suppressing agents selected from the group consisting of monoethylene glycol, dieethylene glycol, propanediol, butanediol, cyclohexanedimethanol, hexane diol and the like, oxalic acid, malonic acid, succinic acid, glutaric acid, adipic acid, pimelic acid, suberic caid, azelaic acid, sebacic acid, brassidic caid, thapsic acid, maleic acid, fumaric acid, glutaconic acid, alpha-hydromuconic acid, beta-hydromuconic acid, alpha-butyl, alpha-ethylglutaric acid, alpha-beta-diethyl succinic acid, isophthalic acid, terephthalic acid, hemimellitic acid and 1,4-cyclohexanedicarboxylic acids, polyethylene naphthalene (PEN) and the like.

Different samples of the modified polybutylene polyester were synthesized by using the similar procedure disposed above in Example-1 by using formulation mentioned in the Table 1. The quantity of the raw materials mentioned in the table is in weight percentage with respect to the polymer. The melting, crystallization and the glass transition temperatures of the polyester were measures using DSC and the results are summarized in table 2.

TABLE 1

Tabulation of raw materials employed and results obtained in Examples 1, 2, 3 and 4

| Raw Materials | Unit | Example 1 | Example 2 | Example 3 | Example 4 |
|---|---|---|---|---|---|
| NDC | Kg | 9.43 | 8 | 7.06 | 7.06 |
| BDO | Kg | 2.09 | 4.7 | 2.9 | 2.9 |
| MEG/PET/IPA/PEN | Kg | 1.92 | 4.81 | 3 | 3 |
| BT | Kg | .003 | — | — | — |
| TiPT(as Ti) | Ppm | 50 | 35 | 35 | 35 |
| Analysis report for Amorphous Sample | | | | | |
| I.V. @ 25° C. | Dl/g | 0.57 | .683 | .583 | .583 |
| —COOH | Meg/kg | 30 | 18 | 27 | 27 |
| Color L* | % | 58 | 63.1 | 71.6 | 71.6 |
| Color b* | — | 1.0 | 10.7 | 5 | 5 |
| MEG/DEGcontent | % | 6.5 | Nil | .44 | .44 |
| Glass transition Temp.(Tg2) | ° C. | 80 | 68 | 65.4 | 65.4 |
| Melting Point (Tm1) | ° C. | 210 | 192 | 185 | 185 |
| Tch2 | ° C. | 97 | 149 | 69.8 | 69.8 |

Example 5: Manufacture of Monolayer Containers Using Modified Polybutylene Naphthalate Polyester by Injection Moulding (IM) Method The polymer from Example 1 was used on IM machine to manufacture containers. Prior to that the chips were dried at required temperature for a fixed duration of time. The mold was cooled with chilled water of 6° C. The melt flow was satisfactory. The containers of 350μ wall thickness were manufactured. The containers were of good color & transparency with superior barrier properties The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this invention, it will be appreciated that various modifications can be made, and that many changes can be made in the preferred embodiments without departing from the principles of the disclosure. These and other modifications in the nature of the invention or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:

1. A polybutylene naphthalate polyester having haze value less than 7 NTU comprising:
    naphthalate dicarboxylic acid or ester thereof; butane diol; crystallization suppressing agent in an amount of 1 to 20 wt % based on total weight of the polyester; agent selected from the group consisting of liquid plasticizer in an amount of 0.5 wt % to 2 wt %; nucleating agent in an amount of 10 ppm to 2000 ppm; branching agent in an amount of 10 ppm to 2000 ppm; anti-oxidizing agent in an amount of 0.1 wt % to 5 wt %; stabilizing agent; additive and optionally, end capped oligomer in an amount of 1 to 20 wt %, wherein said polyester exhibits one or more properties as follows:

color L* range is greater than 50;
color b* ranges from 1 to 15;
monoethylene content of less than 10%;
glass transition temperature in the range of 60° C. to 85° C.; and
haze value less than 7 NTU.

2. The polyester as claimed in claim 1, wherein the nucleating agent used is at least one selected from the group consisting of calcium silicate, nano silica powder, talc, microtalc, aclyn, kaolinite, montmorillonite, synthetic mica, calcium sulfide, boron nitride, barium sulfate, aluminum oxide, neodymium oxide and a metal salt of phenyl phosphonate.

3. The polybutylene naphthalate polyester as claimed in claim 1 for use in monolayer and multilayer container manufacturing, the polybutylene naphthalate polyester exhibiting at least one of:
a polyethylene terephthalate equivalent internal viscosity of greater than 0.50 dL/g;
an oligomer content of less than 1.5 wt %;
a diethylene content of less than 10 wt %;
a carboxylic end groups of less than 100 meq/kg;
haze value less than 7 NTU,
wherein said polybutylene naphthalate polyester is used to improve the barrier performance and maintain transparency of polyethylene terephthalate polyester and products made thereof.

4. The polybutylene naphthalate polyester as claimed in claim 1, wherein the polybutylene naphthalate polyester is used in packaging applications by injection moulding (IM), injection blow moulding, injection stretch blow moulding (ISBM), or extrusion blow moulding.

5. A process for preparing polybutylene naphthalate polyester as claimed in claim 1, having haze value less than 7 NTU for improving barrier performance of polyesters used in making of monolayer or multilayer containers, the process comprising:
a) mixing butane diol with polymerization catalysts, monoethylene glycol, color toner, and at least one crystallization suppressing agent in an amount of 1 to 20 wt % based on total weight of the polyester, wherein said crystallization suppressing agent controls the rate of crystallization and size and shape of crystals to ensure transparency;
b) reacting said mixture with naphthalene dicarboxylic acid or ester thereof to obtain oligomerized product via esterification or ester interchange;
c) polymerizing said oligomer using at least one polymerization catalyst to obtain amorphous polybutylene naphthalate polyester chips;
d) crystallizing said polybutylene naphthalate polyester chips; and
e) subjecting said polyester chips to solid state polymerization to upgrade the intrinsic viscosity (I.V.) up to more than 0.40 dl/gm.

6. The process as claimed in claim 5, wherein the suppressing agent is at least one selected from the group consisting of alkylene diol, cyclic diol, aliphatic or aromatic acid, polyester, or combination thereof.

7. The process as claimed in claim 6, wherein the said alkylene diol is selected from the group consisting of monoethylene glycol, diethylene glycol, propanediol, butanediol, hexane diol.

8. The process as claimed in claim 6, wherein the said cyclic diol is selected from the group consisting of cyclohexane dimethanol.

9. The process as claimed in claim 6, wherein the said aromatic acid is isophthalic acid.

10. The process as claimed in claim 6, wherein the said polyester is selected from the group consisting of polyethylene terphthalate, polyethylene terphthalate glycol modified, polyethylene naphthalene.

* * * * *